Feb. 3, 1925.
H. MENZ
DRAFT EVENER
Filed Jan. 31, 1924
1,524,744
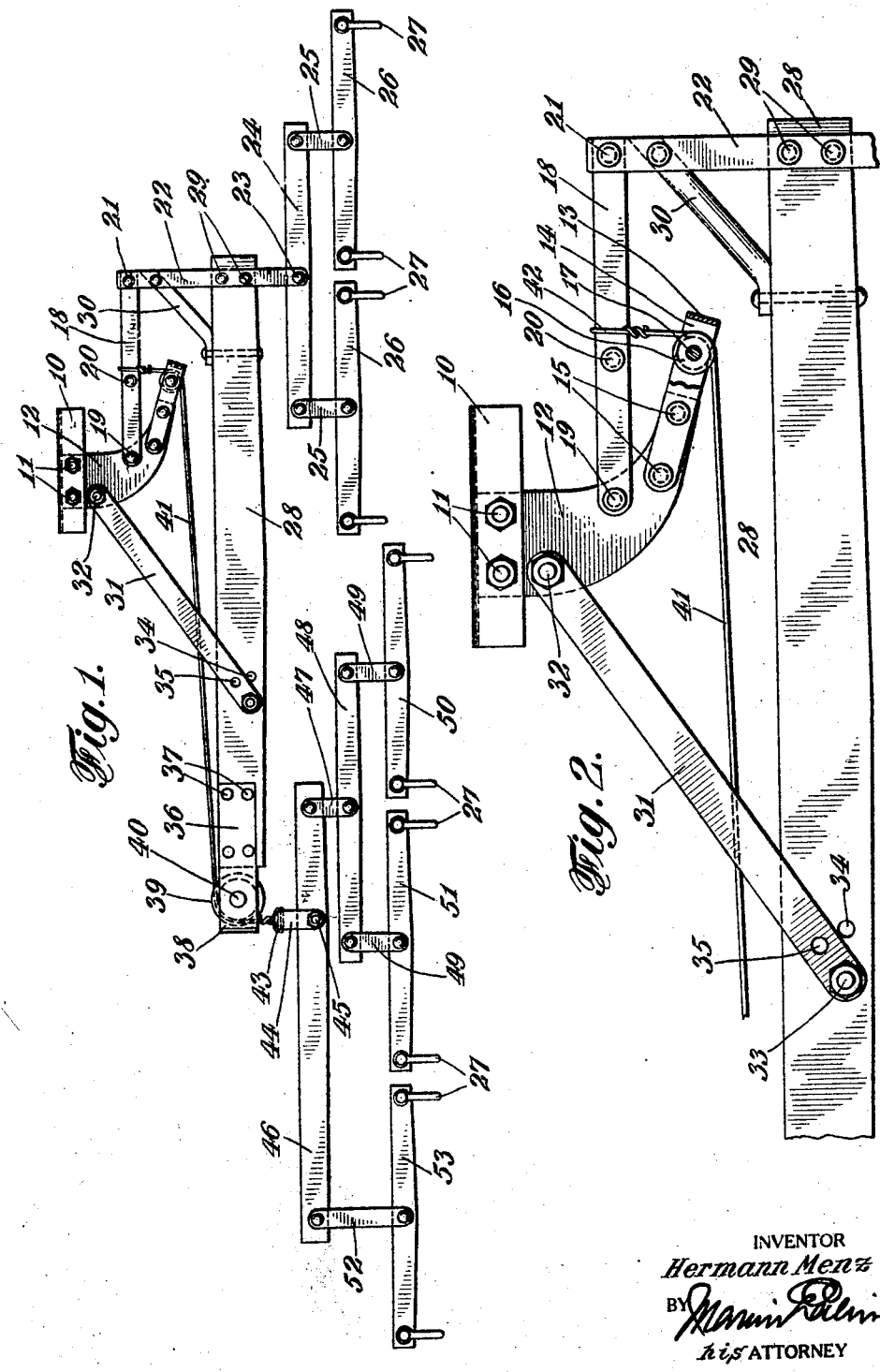
INVENTOR
Hermann Menz
BY
his ATTORNEY Patented Feb. 3, 1925.

1,524,744

UNITED STATES PATENT OFFICE.

HERMANN MENZ, OF AVOCA, NEBRASKA.

DRAFT EVENER.

Application filed January 31, 1924. Serial No. 689,676.

*To all whom it may concern:*

Be it known that I, HERMANN MENZ, a citizen of Germany, residing at Avoca, in the county of Cass and State of Nebraska, have invented certain new and useful Improvements in Draft Eveners, of which the following is a specification.

This invention relates to improvements in devices for proportioning the tractive effect of a number of draft animals so that the power exerted may be equalized or evened.

The main object of the invention is to provide a system of levers so designed as to accomplish the above named results in a simple and practical manner, whereby each animal will pull its proportionate share of the load.

Another purpose is to produce a simple and cheaply constructed device consisting of parts readily attainable whereby a substantial evening of the haul is attained.

These objects and purposes are accomplished by the novel construction, combination and arrangement of parts hereafter described and shown in the accompanying drawing, forming part hereof, and in which:

Figure 1 is a plan view of an evener made in accordance with the invention.

Figure 2 is an enlarged fragmentary part of the same.

Referring more in detail to the drawing, the numeral 10 designates a beam attached to or forming part of the load to be hauled.

Rigidly secured to the beam 10, by bolts 11, is a plate 12 having a laterally and forwardly extending arm 13 doubled upon itself to form a loop 14, the end of the arm being bent to make contact with the plate 12 to which it is secured by rivets 15.

A pulley 16 is revolubly mounted in the loop 14 on a stout pin 17 set in the walls of the loop for a purpose further on described.

A pair of bars 18 are pivotally attached by a rivet 19 to the plate 12, these bars normally extending parallel to the bar 10 and are secured by a confining rivet 20 midway in their length.

The outer ends of the bars 18 are pivotally engaged by a rivet 21 to a forwardly extending bar 22, its front end being pivoted by the rivet to the center of an evener bar 24 connected by pairs of links 25 at its ends with whiffletrees 26 from which extend clevises 27 to be engaged by the harness elements of a pair of draft animals.

Rearward of the evener bar 24 is a heavy bar 28, fixed by rivets 29 between the upper and lower sections of the bar 22, which is further firmly secured by an angularly disposed brace 30 fixed at its ends respectively to the bars 22 and 28.

The bar 28 is held relative to the plate 12 by a link connection 31, a bolt 32 passing through the end of the link 31 and plate 12 and the other angularly extending end of the link is held by a bolt 33 to the bar 28, said bar 28 being provided with an opening 34 and the link 31 with a registrable opening 35, the bolt 33 being engageable in these openings at will.

Secured to the outer end of the main bar 28 is a doubled strap 36 held by rivets 37, its outer portion presenting a clevis-like loop 38 in which a pulley 39 is rotatably mounted on a pin 40 fixed in the side elements of the loop.

A flexible cable 41 has one of its ends engaged as at 42 to the bars 18, from whence it is passed around the pulley 16, run substantially parallel to the main bar 28, at its rear edge, trained over the pulley 39 and fixed at its opposite end 43 in a clevis 44.

Said clevis is pivotally engaged by a bolt 45 with a lever 46 at a point approximately one-third of its length, the longer end extending outward and substantially in register with the bar 24.

Pivotally attached to the short end of the lever 46 are links 47 engaging at the center of an evener bar 48, in turn connected to whiffletrees 50 and 51 having end clevises 27.

Larger links 52 connect the outer end of the lever 46 with a single whiffletree 53 also carrying clevises 27 at its end, the described arrangement providing means for the attachment of five animals.

In operation one pair of animals are engaged to the whiffletrees 26, another pair to the whiffletrees 50 and 51 respectively and the fifth animal to the single whiffletree 53.

The pull of the pair of animals on the whiffletrees 50 and 51 are equalized by the single animal on the whiffletree, due to the proportion of the arms of the lever 46, which, as has been seen, is connected by the cable 41 to the bar 18, and then to the plate 12, to which the link 31 connects the main bar 28, thus substantially equalizing the pull exerted by each animal in hauling the load represented by the bar 10.

Having thus described my invention, what I claim as new and desire to secure by Letters Patent, is:

An evener comprising a haulage bar, a plate fixed to said bar to extend forwardly therefrom, said plate having a laterally bent arm, a pulley revoluble in the arm, a main bar, an angularly disposed link pivoted to said plate at one end and variably engageable with said main bar at the other end, other connections including an arm at one end of said main bar and the plate, an evener bar pivoted in the forwardly extending end of said connections, a pair of whiffletrees carried by said evener bar, a lever bar having a clevis extending rearwardly, links extending forwardly from the lever bar, a second evener bar carried by one of said links, a pair of whiffletrees carried by the second evener bar, a single whiffletree carried by the other of said links, a pulley at the end of said main bar, and a cable attached at its respective ends to the clevis on said lever bar and to said arm, said cable being trained over said pulleys.

In witness whereof I have affixed my signature.

HERMANN MENZ.